Jan. 7, 1936.         A. C. SWANSTROM         2,026,757
                        NUT STRUCTURE
                      Filed July 24, 1934

INVENTOR.
Arthur Carl Swanstrom,
BY John D. Myers
ATTORNEY.

Patented Jan. 7, 1936

2,026,757

UNITED STATES PATENT OFFICE 2,026,757

NUT STRUCTURE

Arthur Carl Swanstrom, Irvington, N. J., assignor to Elastic Stop Nut Corporation, a corporation of New Jersey Application July 24, 1934, Serial No. 736,657

8 Claims. (Cl. 85—32)

The invention relates to improvements in nut structures and is disclosed herein in connection with lock nuts designed to be secured to sheet metal or similar structures.

One of the principal objects of the invention is the provision of a nut which may be easily and securely attached to a sheet of metal or other material. A further object of the invention is the provision of improved means for securing a nut or the like to a sheet of metal or other similar material. Another object of the invention is the provision of improved means for securing a lock nut against rotation with respect to the structure to which it is attached. A still further object of the invention is the provision of improved means for attaching a nut to a sheet metal structure or the like and securing the same against rotation thereon. It is also an object of the invention to provide a nut having a threaded opening which is so formed that the threads may not which is so formed that the threads may not be easily stripped therefrom.

Still further objects and advantages of the invention will be apparent from the following description, taken with the accompanying drawing wherein:

Fig. 2 is a similar view illustrating the manner in which the improved nut is secured to a sheet metal structure or the like;

Figure 1:
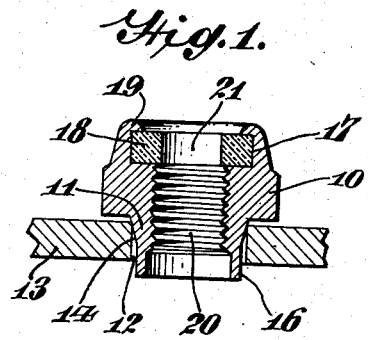
Fig. 1 is a longitudinal sectional view through a nut embodying the present improvements and showing the same in position to be secured to a sheet of metal or other material.

Although various features of the invention are susceptible of use with other forms of nuts, the improvements are disclosed herein in connection with a lock nut having a body portion 10 and a shank 11 extending from one side thereof for engagement within a suitable opening 12 in a sheet of metal or other material 13 to which the nut is to be secured. The surface 14 of the shank 11 is preferably tapered in order to provide tight frictional engagement within the opening 12 when the nut is forced into position and secured with respect to the sheet 13.

A shoulder 15 is provided on the body portion 10 at the junction of the shank 11 therewith for engagement with one face of the sheet 13 when the nut is secured to the sheet. The free end of the shank 11 is provided with a riveting skirt 16 which is of such a thickness as to permit it to be turned outwardly into engagement with the sheet 13 and clamp the edge of the opening 12 between the same and the shoulder 15.

Figure 2:
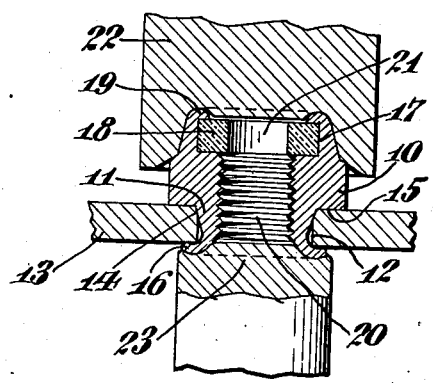
Figure 3:
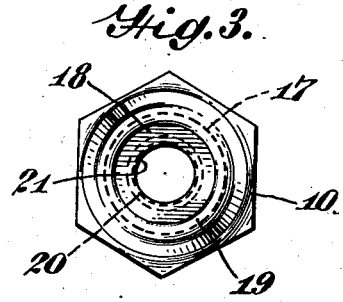
Fig. 3 is a plan view of a nut with the present improvements embodied therein.

As shown in Figs. 1 and 2 of the drawing, the diameter of the shank 11 adjacent the shoulder 15 is larger than the diameter of the opening 12 in the sheet 13, and the shank tapers to a diameter at its opposite end which is less than the diameter of the opening 12. With such a structure the tapered surface of the shank is drawn into tight frictional engagement with the wall of the opening 12 when the riveting skirt 16 is turned over to clamp the edge of the sheet surrounding the opening 12 against the shoulder 15.

The side of the body portion of the nut opposite the shank 11 is provided with an enlarged recess 17 for receiving a washer 18 of vulcanized fiber or similar material, the washer being retained within the recess by turning the edge 19 into gripping engagement therewith. A threaded opening 20 extends from the recess 17 through the body portion 10 and the shank 11, the threads preferably terminating adjacent the base of the riveting skirt 16. The extension of the threaded opening 20 into the shank 11 provides a nut structure from which it is much more difficult to strip the threads than in structures wherein a threaded opening is provided in the body portion only of the nut. The opening 21 in the fiber washer 18 is unthreaded and its diameter is slightly less than the diameter of the threaded opening 20 for reasons which are well understood by those skilled in this art.

In attaching the nut to a sheet metal structure or the like, the sheet of material is provided with suitable openings 12 of a diameter slightly smaller than the diameter of the larger end of the shank 11, as heretofore described, in order that the shank may fit tightly within the opening when the nut is secured in position. The nut may be secured to the sheet by the use of cooperating dolly punches 22 and 23, the former being shaped to fit the outer end of the nut in order not to deform the same, and the latter being so shaped as to turn the free end of the riveting skirt 16 outwardly into engagement with the sheet 13 and thereby securely clamp the edge of the opening 12 between the outwardly turned skirt and the shoulder 15. This operation of clinching or riveting the nut to the sheet serves to force the tapered shank 11 into tight frictional engagement with the wall of the opening 12, and this frictional wedging engagement assists in securing the nut against rotation with respect to the sheet.

Figure 4:
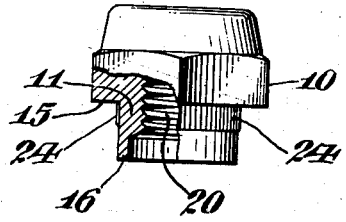
Fig. 4 is an elevational view, partly in section, showing a slightly modified form of nut.

In the modification shown in Fig. 4, the taper is omitted from the shank 11 and the surface is knurled or otherwise roughened as shown at 24. The diameter of the knurled shank is slightly greater than the diameter of the opening 12. A nut provided with such a knurled shank may be secured to a sheet of metal or other material in the same manner as a nut with a tapered shank such as shown in Figs. 1 and 2. In this case, however, the projections from the knurled surface will seat themselves within the wall of the opening in the sheet to thereby assist in preventing rotation of the nut with respect to the sheet.

Figure 5:
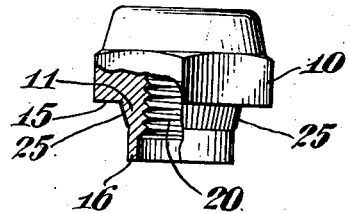
Fig. 5 is a similar view showing a still further modified form of nut.

In the modification shown in Fig. 5 of the drawing, the surface of the shank 11 is both tapered and knurled as shown at 25, and the diameter of the larger end of the shank should be slightly greater than the diameter of the opening 12. A nut of this type may likewise be secured to a sheet in the manner illustrated in Figs. 1 and 2.

As will be readily understood, it is important that effective means be provided for preventing rotation of a lock nut such as disclosed herein. Such nuts are frequently used in locations which are not sufficiently accessible to permit the employment of suitable tools for holding them against rotation when the cooperating bolts or screws are assembled therewith. The frictional engagement of a lock nut of the general type herein disclosed with its cooperating bolt is much greater than with an ordinary nut of non-locking type, and it is therefore essential that effective means be employed for holding the nut against rotation with respect to the sheet to which it is attached. When a nut such as heretofore described is affixed to a sheet of metal or other material, rotation of the nut with respect to the sheet is effectively prevented by means of the structure wherein the edge of the opening through which the shank 11 extends is firmly clinched between the riveting skirt 16 and the shoulder 15. Rotation of the nut is further prevented by means of the frictional, wedging engagement of the tapered shank with the wall of the opening 12, or by the engagement of a knurled shank such as shown in Fig. 4 with the wall of the opening, or by the use of a knurled, tapered shank such as shown in Fig. 5.

While the present improvements are shown in connection with a single thickness of sheet material, it will be readily understood that the improved nut may be secured to two or more thicknesses of material if desired. It will also be understood that the invention is not intended to be limited to the specific details of structure shown herein, but that such scope is to be accorded thereto as is defined by the appended claims.

Having thus described my invention, what I desire to secure by United States Letters Patent is:

1. As a new article of manufacture, a clinch nut having a body portion, a shank portion extending from said body portion and a riveting skirt portion on the free end of said shank portion, there being a surface engaging shoulder at the juncture of the body and shank portions of the nut, the outer surface of the shank portion having a decreasing taper in a direction away from the body portion of the nut, a bore through the nut, said bore being threaded in the body portion of the nut and being recessed adjacent to the face of the nut opposite said shank portion, and a locking washer secured against rotation in said recess.

2. As a new article of manufacture, a clinch nut including a body portion having a plane surface engaging face, a shank portion extending from said face and a riveting skirt portion on the free end of said shank, there being a shoulder at the juncture of the shank portion with said face, the outer surface of the shank portion having a decreasing taper in a direction away from said face, a bore through the nut, said bore having a threaded portion in the body of the nut and extending past the plane of said face into the shank portion of the nut, a recess in the bore adjacent the face of the nut opposite the first mentioned face, and a locking washer secured against rotation in said recess.

3. As a new article of manufacture, a clinch nut having a body portion, a shank portion extending from said body portion and a riveting skirt portion on the free end of said shank portion, there being a surface engaging shoulder at the juncture of the body and shank portions of the nut, the outer surface of the shank portion having a decreasing taper in a direction away from the body portion of the nut, a bore through the nut, said bore having a central threaded portion within the body and shank portions of the nut, a recess adjacent the end of the bore in the body portion of the nut, a counterbore portion at the end of the bore opposite said recess, and a locking washer secured against rotation in said recess.

4. As a new article of manufacture, a clinch nut adapted to be secured in an opening through a plate structure, said nut having a body portion, a shank portion extending from said body portion and a riveting skirt portion on the free end of said shank portion, there being a surface engaging shoulder at the juncture of the body and shank portions of the nut, the diameter of the shank portion at said juncture being greater than the diameter of the opening into which the shank portion is intended to be inserted for mounting the nut and the outer surface of the shank portion having a decreasing taper in a direction away from the body portion of the nut, a threaded bore passing through the nut, and means associated with the body portion of the nut for frictionally locking against rotation a threaded member screwed into said threaded bore.

5. As a new article of manufacture, a clinch nut adapted to be secured in a cylindrical opening through a plate structure, said nut having a body portion, a shank portion extending from said body portion and a riveting skirt portion on the free end of said shank portion, there being a surface engaging shoulder at the juncture of the body and shank portions of the nut, the diameter of the shank portion at said juncture being greater than the diameter of the opening into which the shank portion is intended to be inserted for mounting the nut and the outer surface of the shank portion having a decreasing taper in the direction away from the body portion of the nut to a diameter less than that of said opening at the juncture of the shank portion with the skirt portion, a threaded bore through the nut, and means associated with the body portion of the nut for frictionally locking against rotation a threaded member screwed into said threaded bore.

6. As a new article of manufacture, a clinch nut adapted to be secured in a cylindrical opening through a plate structure, said nut including a body portion having a plane face adapted to engage one face of said structure, a shank portion extending from said body portion and a riveting skirt portion on the free end of said shank portion, the diameter of the shank portion at the juncture between the shank portion and said face being greater than the diameter of the opening into which the shank portion is intended to be inserted for mounting the nut and the outer surface of the shank portion having a decreasing taper in the direction away from the body portion of the nut to a diameter less than that of said opening, a bore through the nut, said bore having a central threaded portion in the body portion of the nut and extending beyond the plane of said face into the shank portion of the nut, a counterbore portion in the skirt portion of the nut and a recess adjacent to the opposite end of the bore, and a locking washer secured against rotation in said recess.

7. The combination with a plate of rigid material having a circular opening therethrough, of a clinch nut having a body portion, a shank portion projecting from one face of said body portion and a riveting skirt portion at the free end of said shank portion, said shank portion having a diameter at the juncture of the shank portion and said face greater than the diameter of said opening and the outer surface of the shank having a decreasing taper in the direction away from the body portion of the nut, said shank and skirt portions extending through said opening and said skirt portion being riveted over to draw said face into engagement with one of the surfaces of said plate and to cause the part of said shank portion adjacent to said face to deform the metal of the plate at the periphery of said opening, whereby to lock the nut against rotation in said opening due to pressure between the outer surface of said shank portion and the walls of the opening, a threaded bore passing through said nut, and means associated with the body portion of the nut for frictionally locking against rotation a member screwed into said threaded bore.

8. The combination with a metal sheet of substantially uniform thickness having a cylindrical opening therethrough and a plane surface around the periphery of said opening, of a clinch nut including a body portion having a plane face for engagement with said surface, a shank portion extending from said face and a skirt portion at the free end of said shank portion, said shank portion having a diameter at the juncture between the shank portion and said face greater than the diameter of said opening and the outer surface of the shank portion having a decreasing taper in the direction away from said face to a diameter less than that of said opening, a bore through said nut, said bore having a central threaded part in the body portion of the nut and extending beyond the plane of said face into the shank portion of the nut, a recess adjacent to the end of the bore in the body portion of the nut remote from said face and a counterbore portion at the opposite end of the bore, and a locking washer secured against rotation in said recess, the skirt portion of the nut being riveted over to draw said face into engagement with the plane surface of said plate and to cause the tapered outer surface of the shank portion of the nut to deform the side walls of said opening laterally and to thereby lock the nut against rotation in said opening due to lateral pressure between the shank portion and the walls of the opening.

ARTHUR CARL SWANSTROM.